US012793549B2

(12) United States Patent
Mondragon et al.

(10) Patent No.: US 12,793,549 B2
(45) **Date of Patent: *Nov. 10, 2026**

(54) SYSTEMS AND METHODS FOR CONTROLLING VEHICLE TRAFFIC

(71) Applicant: Verizon Patent and Licensing Inc., Basking Ridge, NJ (US)

(72) Inventors: Diego Mondragon, Roswell, GA (US); Adrian Abellanoza, Mesquite, TX (US); Seth Allyn Johnston, Canton, GA (US); John Gregory Bosque, Roswell, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 536 days.

This patent is subject to a terminal disclaimer.

(21) Appl. No.: 17/457,954

(22) Filed: Dec. 7, 2021

(65) Prior Publication Data

US 2022/0092981 A1 Mar. 24, 2022

Related U.S. Application Data

(63) Continuation of application No. 16/655,995, filed on Oct. 17, 2019, now Pat. No. 11,210,952.

(51) Int. Cl.
*G08G 1/16* (2006.01)
*G08G 1/01* (2006.01)

(52) U.S. Cl.
CPC ........... *G08G 1/164* (2013.01); *G08G 1/0112* (2013.01); *G08G 1/0125* (2013.01); *G08G 1/166* (2013.01)

(58) Field of Classification Search
CPC .... G08G 1/164; G08G 1/0112; G08G 1/0125; G08G 1/166
See application file for complete search history.

(56) References Cited

U.S. PATENT DOCUMENTS

2014/0368330 A1* 12/2014 Watanabe ................ G08G 1/16 340/475
2015/0314780 A1* 11/2015 Stenneth .............. G05D 1/0061 701/1

(Continued)

OTHER PUBLICATIONS

Miller, et al., "An Adaptive Peer-lo-Peer Collision Warning System", Vehicular Technology Conference. IEEE 55th Vehicular Technology Conference. VTC Spring 2002 (Cal. No.02CH37367), May 6-9, 2002, 5 pages.

*Primary Examiner* — Anne Marie Antonucci
*Assistant Examiner* — Patrick M Brady

(57) ABSTRACT

An edge device may receive first vehicle information and first sensor information associated with a first vehicle. The edge device may receive second vehicle information or second sensor information associated with a second vehicle. The edge device may compare the first vehicle information and the first sensor information to determine a first accuracy score. The edge device may determine, based on the first vehicle information, the first sensor information, the first accuracy score, and the second vehicle information or the second sensor information, whether the first vehicle and the second vehicle are predicted to collide. The edge device may provide to one or more traffic control devices, and based on determining whether the first vehicle and the second vehicle are predicted to collide, one or more instructions to provide signals to at least one of the first vehicle or the second vehicle.

20 Claims, 8 Drawing Sheets

(56) References Cited

U.S. PATENT DOCUMENTS

| | | | | |
|---|---|---|---|---|
| 2017/0221366 | A1* | 8/2017 | An | G08G 1/09623 |
| 2019/0287401 | A1* | 9/2019 | Aoude | G08G 1/164 |
| 2020/0258389 | A1 | 8/2020 | Song et al. | |
| 2020/0286386 | A1 | 9/2020 | Zhou et al. | |
| 2022/0126863 | A1* | 4/2022 | Moustafa | G06T 9/00 |
| 2022/0126864 | A1* | 4/2022 | Moustafa | B60W 60/0013 |
| 2022/0161815 | A1* | 5/2022 | Van Beek | B60W 60/0013 |

* cited by examiner

SYSTEMS AND METHODS FOR CONTROLLING VEHICLE TRAFFIC

RELATED APPLICATION

This application is a continuation of U.S. patent application Ser. No. 16/655,995, filed Oct. 17, 2019, which is incorporated herein by reference in its entirety.

BACKGROUND

Traffic control systems generally are configured to control traffic control signals (e.g., for traffic lights, crosswalks, and/or the like) and coordinate traffic to ensure vehicle and pedestrian safety. Traffic control systems may accomplish this goal using simple clockwork mechanisms and/or systems that include sensors indicating a vehicle and/or pedestrian is waiting at a stoplight.

DETAILED DESCRIPTION OF PREFERRED EMBODIMENTS

Figure 1A:
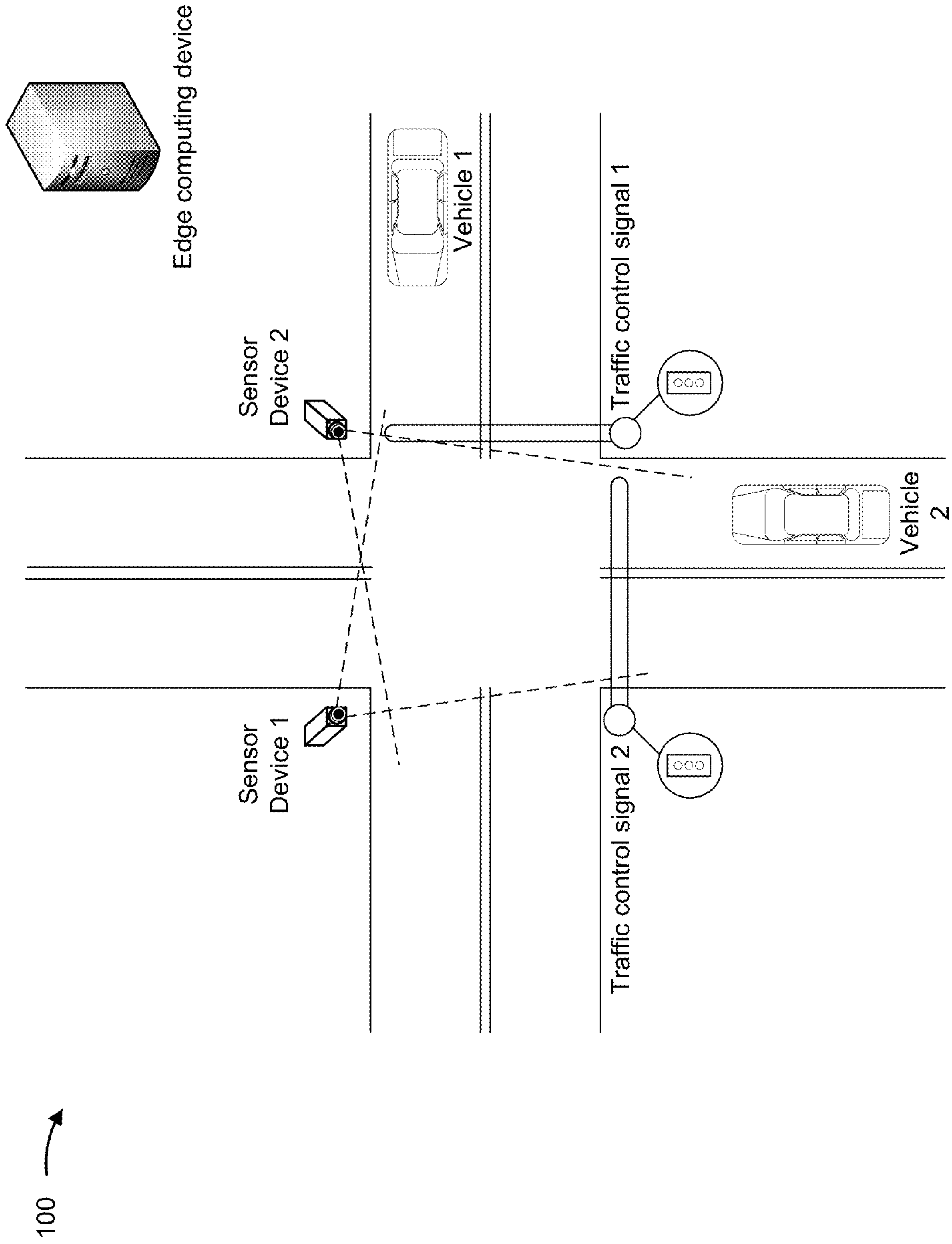
FIGS. 1A-1E are diagrams of one or more example implementations described herein.

The following detailed description of example implementations refers to the accompanying drawings. The same reference numbers in different drawings may identify the same or similar elements.

Traffic control systems may prevent collisions (e.g., between vehicles, between vehicles and pedestrians, and/or the like) by using stages to coordinate traffic flow, where directions of movement permitted in a stage prevent collisions regardless of vehicle and/or pedestrian speed. Traffic control systems may also prevent collisions by collecting data from camera sensors positioned at an intersection to collect position and speed information regarding vehicles approaching the intersection and using the collected data to predict whether the vehicles are likely to collide. Some traffic control systems may collect Global Positioning System (GPS) data from vehicles approaching an intersection and use the GPS data to predict whether the vehicles are likely to collide. However, tracking information provided by camera sensors may not always be reliable (e.g., due to weather conditions, field-of-view obstructions, and/or the like), and GPS data from vehicles may not always be reliable (e.g., due to the quality of the GPS reception and/or the like). Moreover, to avoid collisions, the traffic control system requires near-instantaneous calculations based on collected data. However, sending the collected data to an offsite device for calculations and receiving the results of the calculations from the offsite device may occur within a period of time that is not fast enough to ensure the prevention of a collision. Additionally, or alternatively, sending and receiving the collected data and calculations to and from offsite devices consumes network resources.

Some implementations described herein provide a traffic control system that may use low latency, high bandwidth processing by an edge device at an intersection to perform near-instantaneous calculations based on data collected from sensors and devices in vehicles to prevent collisions. In some implementations, the edge device may receive, from a first device in a first vehicle moving towards the intersection, first-vehicle-provided-tracking information and, from a first sensor device at the intersection, sensor-provided-first-vehicle-tracking information. In some implementations, the edge device may receive, from a second device in a second vehicle moving towards the intersection, second-vehicle-provided-tracking information and, from a second sensor device at the intersection, sensor-provided-second-vehicle-tracking information. The edge device may determine whether the first-vehicle-provided-tracking information matches the sensor-provided-first-vehicle-tracking information and/or whether the second-vehicle-provided-tracking information matches the sensor-provided-second-vehicle-tracking information. In this way, the edge device may confirm the accuracy of the data by determining whether sensor-provided information and vehicle-provided information matches. In some implementations, the edge device may determine whether the first vehicle and the second vehicle are predicted to collide based on the first-vehicle-provided-tracking information and the second-vehicle-provided-tracking information and provide instructions to one or more traffic control devices (e.g., traffic lights and/or the like) to provide signals to the first vehicle and/or the second vehicle. In this way, the edge device may create a localized network with the first vehicle and the second vehicle and therefore conserve network resources because the data may be transmitted within the localized network instead of being transmitted to offsite devices. In some implementations, the traffic control system may allow vehicles to pass freely through the intersection when no collision is predicted, which conserves fuel otherwise consumed while the vehicles are stopped. Additionally, or alternatively, the traffic control system may send messages to drivers approaching the intersection and/or commands for operating autonomous or semi-autonomous vehicles approaching the intersection that increase the safety of the intersection and prevent financial-resource consuming collisions.

FIGS. 1A-1E are diagrams of one or more example implementations 100 described herein. For example, as shown in FIGS. 1A-1E, example implementation(s) 100 includes an edge computing device, a sensor device 1, a sensor device 2, a vehicle 1, a vehicle 2, a traffic control signal 1, and a traffic control signal 2.

As shown in FIG. 1A, a traffic control system for an intersection may include the edge computing device, sensor device 1, sensor device 2, traffic control signal 1, and traffic control signal 2. In some implementations, the traffic control system may be for a drivable location (e.g., a left turn, a right turn, a roundabout, an intersection such as an intersection of two roads that cross each other, an intersection of more than two roads, an intersection at which a first road does not pass through a second road and vehicles on the first road must turn right or left onto the second road, such as a "T" intersection and/or a "Y" intersection, and/or the like, one or more lanes merging with one or more other lanes, for example, an on-ramp, an off-ramp, and/or the like). Although FIGS. 1A-1E provide an example involving an intersection of two roads that cross each other, other examples may involve another drivable location. Accordingly, where the example of FIGS. 1A-1E refer to an intersection, the example may also be applied to a drivable location.

In some implementations, the edge computing device may be located at the intersection. For example, the edge computing device may be located in close enough proximity to the intersection that the edge computing device may communicate wirelessly (e.g., over a 5G network) with sensor device 1, sensor device 2, traffic control signal 1, traffic control signal 2, vehicle 1 (e.g., a device in vehicle 1 and/or the like), and/or vehicle 2 (e.g., a device in vehicle 2 and/or the like). In this way, the edge computing device may send and receive data to and from the other devices at the intersection via a low latency, high bandwidth localized network.

As shown in FIG. 1A, sensor device 1 and sensor device 2 may be located at the intersection and each sensor device may have a field of view to detect vehicles, pedestrians, objects, and/or the like approaching, passing through, and/or exiting the intersection. For example, sensor device 1 may have a field of view that includes a central portion of the intersection, one or more lanes to the east of the intersection (as shown in FIG. 1A), and/or one or more lanes to the south of the intersection (as shown in FIG. 1A). In some implementations, each of sensor device 1 and sensor device 2 may include a smart camera, a sensor, and/or the like and may provide, to the edge computing device, tracking information and/or the like for vehicles, pedestrians, objects, and/or the like within the field of view. For example, each of sensor device 1 and sensor device 2 may use machine vision techniques and/or the like to detect, identify, and/or generate tracking information for vehicles, pedestrians, objects, and/or the like within the field of view.

As shown in FIG. 1A, traffic control signal 1 and traffic control signal 2 may be located at the intersection and may each be positioned to provide signals to vehicles approaching the intersection. For example, traffic control signal 1 may be positioned to provide signals to vehicles approaching the intersection from the east and west of the intersection (as shown in FIG. 1A), and traffic control signal 2 may be positioned to provide signals to vehicles approaching the intersection from the north and south of the intersection (as shown in FIG. 1A). In some implementations, each of traffic control signal 1 and traffic control signal 2 may provide data to and/or receive instructions from the edge computing device.

As shown in FIG. 1A, vehicle 1 may be traveling in a direction from the east of the intersection toward the west of the intersection, within the field of view of sensor device 1, and/or receiving a signal from traffic control signal 1. As also shown in FIG. 1A, vehicle 2 may be traveling in a direction from south of the intersection to north of the intersection, within the field of view of sensor device 2, and/or receiving a signal from traffic control signal 2.

Figure 1B:
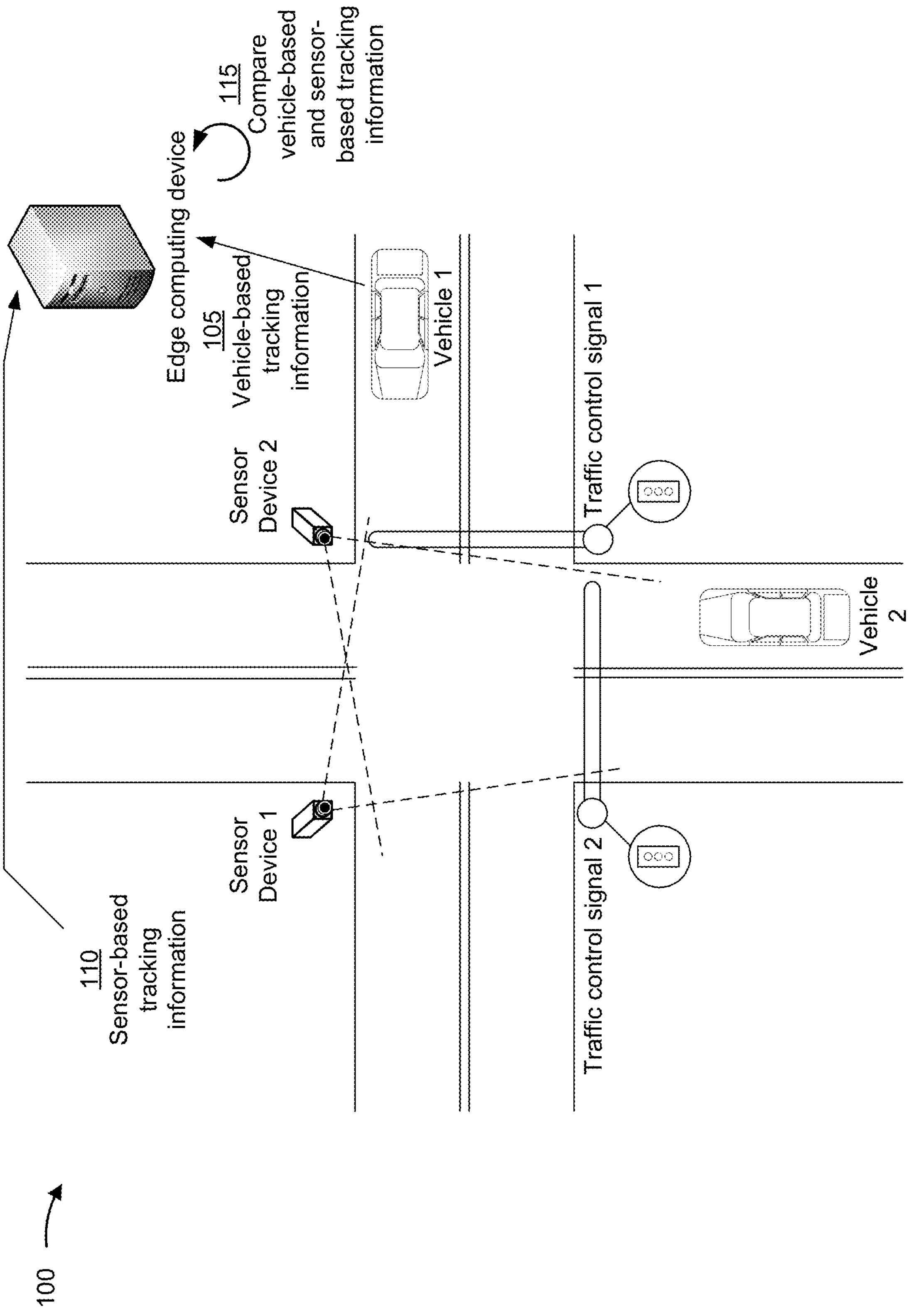

As shown in FIG. 1B, and by reference number 105, vehicle 1 may provide, to the edge computing device, vehicle-based tracking information for vehicle 1. In some implementations, the vehicle-based tracking information may include information identifying a location of vehicle 1 (e.g., a GPS location and/or the like), a direction of travel of vehicle 1, and/or a speed of vehicle 1. For example, the vehicle-based tracking information may include GPS coordinates of vehicle 1, an angle of travel of vehicle 1 within a coordinate system, and/or a current speed of vehicle 1.

In some implementations, vehicle 1 may include a vehicle device (e.g., a mobile device within vehicle 1, an in-vehicle system, a dongle device, and/or the like). The vehicle device may capture the vehicle-based tracking information and may provide the vehicle-based tracking information to the edge computing device. For example, a driver of vehicle 1 may have a mobile device that captures and provides vehicle-based tracking information to the edge computing device. Additionally, or alternatively, vehicle 1 may be an autonomous vehicle that includes an in-vehicle device that captures and provides vehicle-based tracking information to the edge computing device. The vehicle-based tracking information for vehicle 1 will be referred to at times as first-vehicle-provided-tracking information.

In some implementations, the vehicle device in vehicle 1 may determine a location of vehicle 1 based on GPS data, cellular signal data, Wi-Fi signal data, and/or the like. For example, the vehicle device may capture GPS coordinates identifying the location of vehicle 1 and include, in the vehicle-based tracking information, the GPS coordinates of vehicle 1.

In some implementations, the vehicle device may determine a direction of travel of vehicle 1 by calculating a bearing of vehicle 1 from a first location to a second location, where the bearing may be an angle between a reference line (e.g., the north-south line of earth and/or the like) and a line connecting the first location and the second location. For example, the vehicle device may calculate the bearing of vehicle 1 using the following formulas:

$$\beta = \tan^{-1}2(X, Y),$$

where β is the bearing of vehicle 1 in radians and X and Y are two quantities that can be calculated as follows:

$$X = \cos b * \sin\Delta L; \text{ and}$$

$$Y = \cos a * \sin b - \sin a * \cos b * \cos\Delta L,$$

where "b" is a latitudinal coordinate of the second location in radians, "a" is a latitudinal coordinate of the first location in radians, and "ΔL" is a difference between a longitudinal coordinate of the second location in radians and a longitudinal coordinate of the first location in radians.

In some implementations, the vehicle device may determine the direction of travel of vehicle 1 using a magnetic compass, gyroscope, gyrocompass, and/or the like. For example, the vehicle device may include a gyrocompass that provides a heading based on an orientation of the vehicle device, and, if the orientation of the vehicle device within vehicle 1 is known and fixed, the vehicle device may determine the direction of travel of vehicle 1 based on the heading from the gyrocompass and the known orientation of the vehicle device within vehicle 1. Additionally, or alternatively, the vehicle device may determine the direction of travel of vehicle 1 based on a heading (e.g., from an in-vehicle gyrocompass, magnetic compass, and/or the like) obtained via the connection to the computer system of vehicle 1 (e.g., via the on-board diagnostics (OBD) port and/or the like).

In some implementations, the vehicle device in vehicle 1 may capture the vehicle-based tracking information and may provide the vehicle-based tracking information to the edge computing device at regular intervals (e.g., every second, every two seconds, and/or the like). For example, the vehicle device may record a first location of vehicle 1 at a first time, record a second location of vehicle 1 at a second time, and calculate a speed of vehicle 1 by determining a distance between the first location and the second location and dividing the distance by the difference between the second time and the first time. Additionally, or alternatively, the vehicle device may capture the speed of vehicle 1 by collecting speedometer readings via a connection to a computer system of vehicle 1 (e.g., via an on-board diagnostics (OBD) port and/or the like).

As shown in FIG. 1B, and by reference number 110, sensor device 1 may provide, to the edge computing device, sensor-based tracking information for vehicle 1. In some implementations, the sensor-based tracking information may include information identifying a location of vehicle 1 (e.g., a GPS location, a distance from sensor device 1, a distance from a reference location, and/or the like), a direction of travel of vehicle 1, and/or a speed of vehicle 1. For example, the sensor-based tracking information may include GPS coordinates of vehicle 1, the angle of travel of vehicle 1 within the coordinate system, and/or the current speed of vehicle 1. The sensor-based tracking information for vehicle 1 will be referred to at times as sensor-provided-first-vehicle-tracking information.

In some implementations, sensor device 1 may determine the location of vehicle 1 by capturing an image of vehicle 1 and using image analysis techniques on the captured image. For example, sensor device 1 may compare a location of vehicle 1 in the image to another object in the image having a known location (e.g., with respect to sensor device 1, in GPS coordinates, and/or the like) and, based on the comparison and known characteristics of the image (e.g., a real-world distance associated with a width of a pixel in the image and/or the like), determine the location of vehicle 1. Stated differently, sensor device 1 may determine the location of vehicle 1 by determining the location of vehicle 1 in the image with respect another object in the image having a known location.

Additionally, or alternatively, sensor device 1 may determine the location of vehicle 1 by capturing an image of vehicle 1, determining a location of vehicle 1 in the image, and converting the location of vehicle 1 in the image to a real-world location (e.g., GPS coordinates and/or the like) based on a known relationship between real-world locations and locations in captured images. For example, when sensor device 1 is installed at the intersection, the relationship between an image plane of sensor device 1 and locations on a road may be established using known measurements and geometric principles. In some implementations, after sensor device 1 captures an image of vehicle 1, sensor device 1 may determine a location of vehicle 1 in the image plane and, using the relationship, determine the location of vehicle 1 on the road.

In some implementations, sensor device 1, when determining a location of vehicle 1 in the image, may determine a center of vehicle 1 in the image, where the center corresponds to a center of pixels in the image including vehicle 1, and may determine the location of vehicle 1 based on the center of vehicle 1 in the image. Additionally, or alternatively, sensor device 1 may identify a feature of vehicle 1 (e.g., a license plate, a windshield, a front bumper, and/or the like), determine a center of the feature in the image, where the center corresponds to a center of pixels in the image including the feature, and determine the location of vehicle 1 based on the center of the feature.

In some implementations, sensor device 1, when determining a location of vehicle 1 in the image, may determine a bounding box for vehicle 1 in the image, where the bounding box has a regular shape (e.g., a square, a rectangle, and/or the like) and includes a percentage (e.g., 100 percent, 98 percent, 95 percent, 90 percent, 80 percent, and/or the like) of pixels in the image including vehicle 1 and/or a feature of vehicle 1. Sensor device 1 may determine a location of vehicle 1 based on a center of the bounding box in the image.

In some implementations, sensor device 1 may determine the direction of travel of vehicle 1 based on comparing a first location of vehicle 1 and a second location of vehicle 1. For example, the sensor device 1, using latitudinal and longitudinal coordinates for the first and second locations, may determine the direction of travel of vehicle 1 by calculating, using the formulas described herein with respect to the vehicle device, a bearing of vehicle 1 from the first location to the second location.

Additionally, or alternatively, sensor device 1 may determine the direction of travel of vehicle 1 based on a known orientation of a lane in which vehicle 1 is traveling. For example, sensor device 1 may capture an image of vehicle 1, determine a lane in which vehicle 1 is traveling, and, based on known information regarding an orientation of the lane in which vehicle 1 is traveling, determine the direction of travel of vehicle 1.

In some implementations, sensor device 1 may determine the speed of vehicle 1 by capturing a first image of vehicle 1 at a first time and a second image of vehicle 1 at a second time, determining, based on the first image, a first location of vehicle 1 at the first time, and determining, based on the second image, a second location of vehicle 1 at the second time. Sensor device 1 may calculate a speed of vehicle 1 by dividing a distance between the second location and the first location by a difference between the second time and the first time.

In some implementations, when determining the speed of vehicle 1, sensor device 1 may determine the first location of vehicle 1 and the second location of vehicle 1 using one or more of the above-described techniques. For example, sensor device 1 may determine the first location of vehicle 1 by identifying a feature of vehicle 1 and determining a center of the feature in the first image and may determine the second location of vehicle 1 by determining a center of the feature in the second image. Additionally, or alternatively, sensor device 1 may determine the first location of vehicle 1 by determining a center of a bounding box for vehicle 1 in the first image and may determine the second location of vehicle 1 by determining a center of a bounding box for vehicle 1 in the second image.

A number of techniques are identified above for determining a location, direction, and/or speed of a vehicle. These techniques are intended merely as examples of techniques that can be used to determine a location of a vehicle, a direction of a vehicle, and/or a speed of a vehicle. The actual techniques used to determine location, direction, and/or speed may include any single technique identified above, a combination of techniques including one or more of the techniques identified above, and/or one or more techniques not identified above.

As shown in FIG. 1B, and by reference number 115, the edge computing device may compare the vehicle-based tracking information for vehicle 1 and the sensor-based tracking information for vehicle 1. For example, the edge computing device may determine whether the vehicle-based tracking information for vehicle 1 matches the sensor-based tracking information for vehicle 1. In some implementations, the edge computing device may determine that the vehicle-based tracking information matches the sensor-based tracking information based on a comparison of the vehicle-based tracking information and the sensor-based tracking information satisfying a threshold level of similarity (e.g., 90%, 95%, 98%, and/or the like). For example, the edge computing device may determine that the vehicle-based tracking information for vehicle 1 matches the sensor-based tracking information for vehicle 1 when the vehicle-based tracking information and the sensor-based tracking information are not an identical match but are within the threshold level of similarity.

In some implementations, the edge computing device may compare each item of vehicle-based tracking information for vehicle 1 to a corresponding item of sensor-based tracking information for vehicle 1. For example, the edge computing device may determine that the speed of vehicle 1 included in the vehicle-based tracking information matches the speed of vehicle 1 included in the sensor-based tracking information based on a comparison of the speed of vehicle 1 included in the vehicle-based tracking information and the speed of vehicle 1 included in the sensor-based tracking information satisfying the threshold level of similarity.

In some implementations, the edge computing device may assign a matching score for each item of tracking information for vehicle 1 and determine that the vehicle-based tracking information for vehicle 1 matches the sensor-based tracking information for vehicle 1 based on a composite matching score calculated from the matching scores for each item. For example, the edge computing device may compare the direction of travel of vehicle 1 included in the vehicle-based tracking information and the direction of travel of vehicle 1 included in the sensor-based tracking information and assign, based on a result of the comparison, a matching score for the direction of travel. In some implementations, higher matching scores may correspond to smaller differences between vehicle-based tracking information and sensor-based tracking information, and lower matching scores may correspond to larger differences between vehicle-based tracking information and sensor-based tracking information. In this way, the edge computing device may assign a matching score for each item of tracking information, such that a higher matching score indicates that the vehicle-based tracking information is more similar to the sensor-based tracking information and a lower matching indicates that the vehicle-based tracking information is less similar to the sensor-based tracking information.

In some implementations, the edge computing device may calculate, based on the matching scores, a composite matching score. For example, the edge computing device may apply weights (e.g., multipliers and/or the like) to the matching scores and sum the weighted matching scores to determine the composite matching score. In this way, the edge computing device may apply larger weights to items of tracking information which are more important to confirm for purposes of predicting a collision and lower weights to items of tracking information which are less important to confirm for purposes of predicting a collision. For example, the direction of travel of vehicle 1 may be less important for purposes of predicting a collision than the location and the speed of vehicle (e.g., due to known orientations of lanes in the intersection and/or the like), and the edge computing device may apply smaller weights to the matching score for the direction of travel when calculating the composite matching score.

In some implementations, the edge computing device may determine whether the composite matching score satisfies a matching threshold. For example, composite matching scores that satisfy the matching threshold may indicate a correspondence between the vehicle-based tracking information for vehicle 1 and sensor-based tracking information for vehicle 1 that indicates that the vehicle-based tracking information for vehicle 1 is accurate.

Figure 1C:
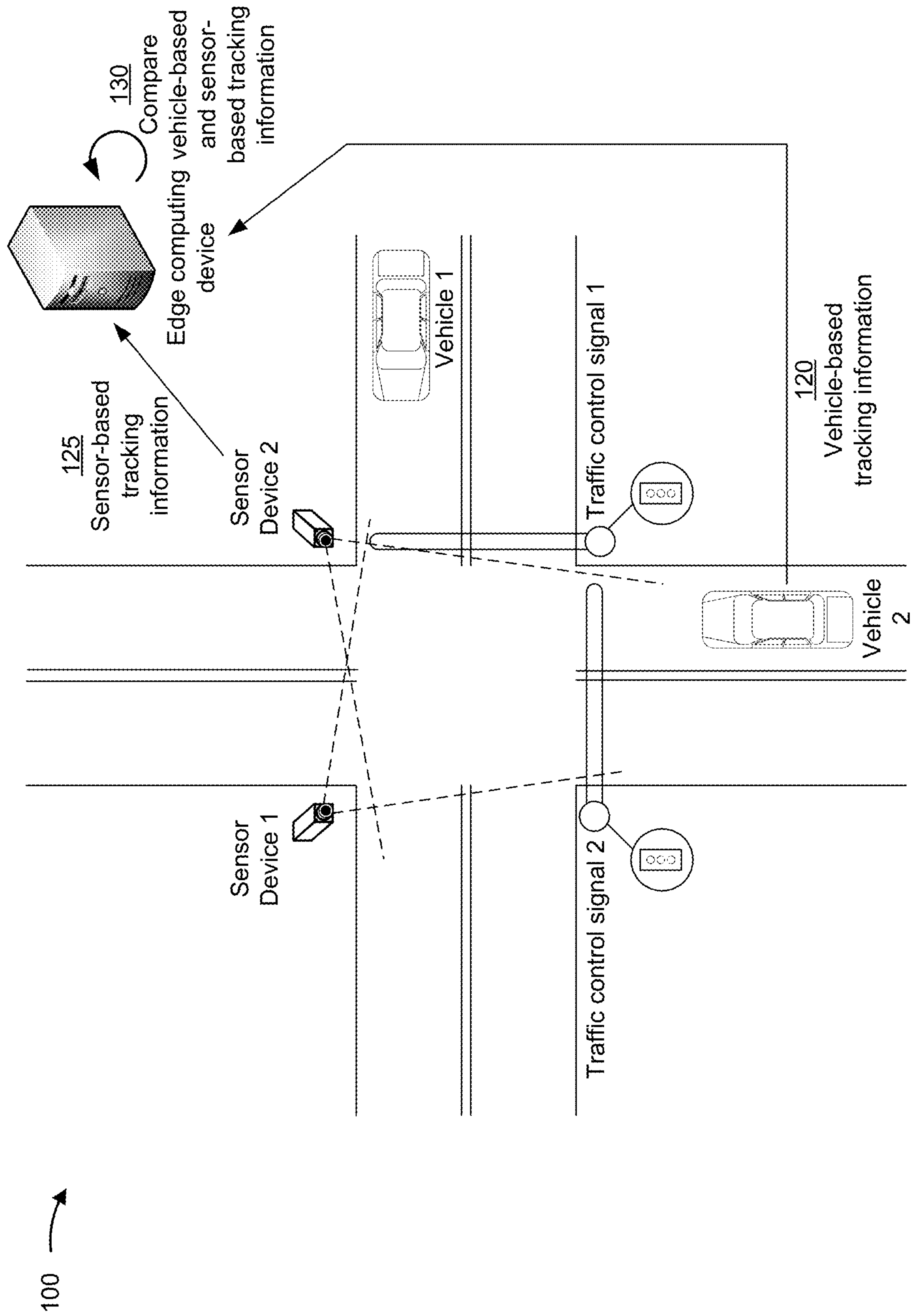

As shown in FIG. 1C, and by reference number 120, vehicle 2 may provide, to the edge computing device, vehicle-based tracking information for vehicle 2. In some implementations, the vehicle-based tracking information may include a location of vehicle 2 (e.g., a GPS location and/or the like), a direction of travel of vehicle 2, and/or a speed of vehicle 2. For example, the vehicle-based tracking information may include GPS coordinates of vehicle 2, an angle of travel of vehicle 2 within a coordinate system, and/or a current speed of vehicle 2.

In some implementations, vehicle 2 may include a device (e.g., a mobile device within vehicle 2, an in-vehicle system, a dongle device, and/or the like), and the device may provide, to the edge computing device, the vehicle-based tracking information. For example, a driver of vehicle 2 may have a mobile device that provides vehicle-based tracking information to the edge computing device. Additionally, or alternatively, vehicle 2 may be an autonomous vehicle that provides vehicle-based tracking information to the edge computing device. The vehicle-based tracking information for vehicle 2 will be referred to at times as second-vehicle-provided-tracking information.

In some implementations, the vehicle device in vehicle 2 may determine a location of vehicle 2 based on GPS data, cellular signal data, Wi-Fi signal data, and/or the like. For example, the vehicle device may capture GPS coordinates identifying the location of vehicle 2 and include, in the vehicle-based tracking information, the GPS coordinates of vehicle 2.

In some implementations, the vehicle device may determine a direction of travel of vehicle 1 by calculating a bearing of vehicle 1 from the first location to the second location, where the bearing may be an angle between a reference line (e.g., the north-south line of earth and/or the like) and a line connecting the first location and the second location. For example, the vehicle device may calculate the bearing of vehicle 2 as described herein with respect to calculating the bearing of vehicle 1. Additionally, or alternatively, the vehicle device may determine the direction of travel of vehicle 2 using a magnetic compass, gyroscope, gyrocompass, and/or the like as described herein with respect to determining the direction of travel of vehicle 1. In some implementations, the vehicle device may determine the direction of travel of vehicle 2 based on a heading (e.g., from an in-vehicle gyrocompass, magnetic compass, and/or the like) obtained via the connection to the computer system of vehicle 1 (e.g., via the on-board diagnostics (OBD) port and/or the like).

In some implementations, the vehicle device in vehicle 2 may capture the vehicle-based tracking information and may provide the vehicle-based tracking information to the edge computing device at regular intervals (e.g., every second, every two seconds, and/or the like). For example, the vehicle device may record a first location of vehicle 2 at a first time, record a second location of vehicle 2 at a second time, and calculate a speed of vehicle 2 by determining a distance between the first location and the second location and dividing the distance by the difference between the second time and the first time. Additionally, or alternatively, the vehicle device may capture the speed of vehicle 2 by collecting speedometer readings via a connection to a computer system of vehicle 2 (e.g., via an on-board diagnostics (OBD) port and/or the like).

As shown in FIG. 1C, and by reference number 125, sensor device 2 may provide, to the edge computing device, sensor-based tracking information for vehicle 2. In some implementations, the sensor-based tracking information may include a location of vehicle 2 (e.g., a GPS location, a distance from sensor device 2, a distance from a reference location, and/or the like), a direction of travel of vehicle 2, and/or a speed of vehicle 2. For example, the sensor-based tracking information may include GPS coordinates of vehicle 2, the angle of travel of vehicle 2 within the coordinate system, and/or the current speed of vehicle 2. The sensor-based tracking information for vehicle 2 will be referred to at times as sensor-provided-second-vehicle-tracking information.

In some implementations, sensor device 2 may determine the location of vehicle 2 by capturing an image of vehicle 2 and using image analysis techniques on the captured image. For example, sensor device 2 may compare a location of vehicle 2 in the image to another object in the image having a known location (e.g., with respect to sensor device 2, in GPS coordinates, and/or the like) and, based on the comparison and known characteristics of the image (e.g., a real-world distance associated with a width of a pixel in the image and/or the like), determine the location of vehicle 2. Stated differently, sensor device 2 may determine the location of vehicle 2 by determining the location of vehicle 2 in the image with respect another object in the image having a known location.

Additionally, or alternatively, sensor device 2 may determine the location of vehicle 2 by capturing an image of vehicle 2, determining a location of vehicle 2 in the image, and converting the location of vehicle 2 in the image to a real-world location (e.g., GPS coordinates and/or the like) based on a known relationship between real-world locations and locations in captured images. For example, when sensor device 2 is installed at the intersection, the relationship between an image plane of sensor device 2 and locations on a road may be established using known measurements and geometric principles. In some implementations, after sensor device 2 captures an image of vehicle 2, sensor device 2 may determine a location of vehicle 2 in the image plane and, using the relationship, determine the location of vehicle 2 on the road.

In some implementations, sensor device 2, when determining a location of vehicle 2 in the image, may determine a center of vehicle 2 in the image, where the center corresponds to a center of pixels in the image including vehicle 2, and may determine the location of vehicle 2 based on the center of vehicle 2 in the image. Additionally, or alternatively, sensor device 2 may identify a feature of vehicle 2 (e.g., a license plate, a windshield, a front bumper, and/or the like), determine a center of the feature in the image, where the center corresponds to a center of pixels in the image including the feature, and determine the location of vehicle 2 based on the center of the feature.

In some implementations, sensor device 2, when determining a location of vehicle 2 in the image, may determine a bounding box for vehicle 2 in the image, where the bounding box has a regular shape (e.g., a square, a rectangle, and/or the like) and includes a percentage (e.g., 100 percent, 98 percent, 95 percent, 90 percent, 80 percent, and/or the like) of pixels in the image including vehicle 2 and/or a feature of vehicle 2. Sensor device 2 may determine a location of vehicle 2 based on a center of the bounding box in the image.

In some implementations, sensor device 2 may determine the direction of travel of vehicle 2 based on comparing a first location of vehicle 2 and a second location of vehicle 2. For example, the sensor device 2, using latitudinal and longitudinal coordinates for the first and second locations, may determine the direction of travel of vehicle 2 by calculating, using the formulas described herein with respect to the vehicle device of vehicle 1, a bearing of vehicle 2 from the first location to the second location.

Additionally, or alternatively, sensor device 2 may determine the direction of travel of vehicle 2 based on a known orientation of a lane in which vehicle 2 is traveling. For example, sensor device 2 may capture an image of vehicle 2, determine a lane in which vehicle 2 is traveling, and, based on known information regarding an orientation of the lane in which vehicle 2 is traveling, determine the direction of travel of vehicle 2.

In some implementations, sensor device 2 may determine the speed of vehicle 2 by capturing a first image of vehicle 2 at a first time and a second image of vehicle 2 at a second time, determining, based on the first image, a first location of vehicle 2 at the first time, and determining, based on the second image, a second location of vehicle 2 at the second time. Sensor device 2 may calculate a speed of vehicle 2 by dividing a distance between the second location and the first location by a difference between the second time and the first time.

In some implementations, when determining the speed of vehicle 2, sensor device 2 may determine the first location of vehicle 2 and the second location of vehicle 2 using one or more of the above-described techniques. For example, sensor device 2 may determine the first location of vehicle 2 by identifying a feature of vehicle 2 and determining a center of the feature in the first image and may determine the second location of vehicle 2 by determining a center of the feature in the second image. Additionally, or alternatively, sensor device 2 may determine the first location of vehicle 2 by determining a center of a bounding box for vehicle 2 in the first image and may determine the second location of vehicle 2 by determining a center of a bounding box for vehicle 2 in the second image.

A number of techniques are identified above for determining a location, direction, and/or speed of a vehicle. These techniques are intended merely as examples of techniques that can be used to determine a location of a vehicle, a direction of a vehicle, and/or a speed of a vehicle. The actual techniques used to determine location, direction, and/or speed may include any single technique identified above, a combination of techniques including one or more of the techniques identified above, and/or one or more techniques not identified above.

In some implementations, sensor device 1 and sensor device 2 may provide sensor-based tracking information for vehicle 1 and vehicle 2. For example, vehicle 1 and vehicle 2 may both be in the field of view of sensor device 1. Additionally, or alternatively, vehicle 1 and vehicle 2 may both be in the field of view of sensor device 2. In some implementations, sensor device 1 may provide, to the edge computing device, sensor-based tracking information for vehicle 1 and sensor-based tracking information for vehicle 2, and sensor device 2 may provide, to the edge computing device, sensor-based tracking information for vehicle 1 and sensor-based tracking information vehicle 2.

As shown in FIG. 1C, and by reference number 130, the edge computing device may compare the vehicle-based tracking information for vehicle 2 and the sensor-based tracking information for vehicle 2. For example, the edge computing device may determine whether the vehicle-based tracking information for vehicle 2 matches the sensor-based tracking information for vehicle 2. In some implementations, the edge computing device may determine that the vehicle-based tracking information matches the sensor-based tracking information based on a comparison of the vehicle-based tracking information and the sensor-based tracking information satisfying a threshold amount of matching. For example, the edge computing device may determine that the vehicle-based tracking information for vehicle 2 matches the sensor-based tracking information for vehicle 2 when the vehicle-based tracking information and the sensor-based tracking information are not an identical match but are within the threshold level of similarity.

In some implementations, the edge computing device may compare each item of vehicle-based tracking information for vehicle 2 to a corresponding item of sensor-based tracking information for vehicle 2 in similar manner as that described with respect to vehicle 1. Additionally, or alternatively, the edge computing device may assign a matching score for each item of tracking information for vehicle 2 and determine that the vehicle-based tracking information for vehicle 2 matches the sensor-based tracking information for vehicle 2 based on a composite matching score calculated from the matching scores for each item in a similar manner as that described with respect to vehicle 1.

In some implementations, the edge computing device may calculate, based on the matching scores, a composite matching score for the tracking information for vehicle 2 in a similar manner as that described with respect to vehicle 1. Additionally, or alternatively, the edge computing device, when calculating the composite matching score for the tracking information for vehicle 2, may apply the same, similar, and/or different weights to the matching scores as those used for calculating the composite score of the tracking information for vehicle 1. For example, the edge computing device may apply different weights for vehicle 2 from the weights applied for vehicle 1 based on differences between sensor device 1 and sensor device 2 (e.g., differences in resolution, differences in sensor accuracy, differences in orientation with respect to the intersection and/or lanes of travel, and/or the like).

In some implementations, the edge computing device may determine whether the composite matching score for the tracking information for vehicle 2 satisfies a matching threshold. For example, composite matching scores that satisfy the matching threshold may indicate a correspondence between the vehicle-based tracking information for vehicle 2 and sensor-based tracking information for vehicle 2 that indicates that the vehicle-based tracking information for vehicle 2 is accurate.

Figure 1D:
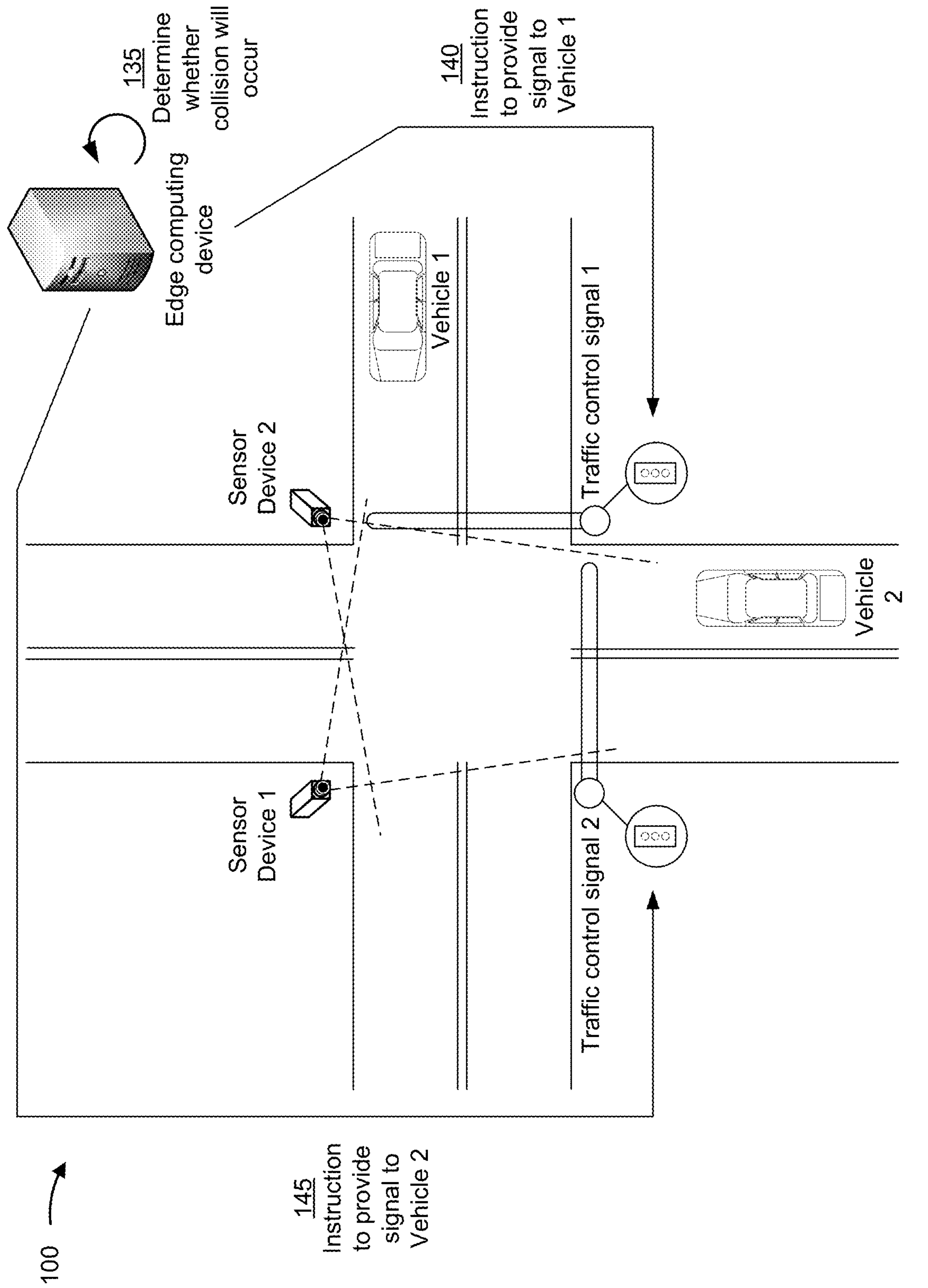

As shown in FIG. 1D, and by reference number 135, the edge computing device may determine whether a collision is likely to occur. In some implementations, the edge computing device may predict whether vehicle 1 and vehicle 2 are likely to collide. For example, the edge computing device may predict whether vehicle 1 and vehicle 2 are likely to collide based on the vehicle-based tracking information for vehicle 1, the sensor-based tracking information for vehicle 1, the vehicle-based tracking information for vehicle 2, and/or the sensor-based tracking information for vehicle 2.

In some implementations, the edge computing device may use a collision predicting algorithm that calculates a predicted intersection of paths for vehicle 1 and vehicle 2, calculates expected times to the predicted intersection of paths for vehicle 1 and vehicle 2, and/or predicts whether a collision is likely to occur based on the calculations and/or a boundary parameter to account for sizes of vehicle 1 and vehicle 2. For example, the edge computing device may use the vehicle-based tracking information for vehicle 1, the sensor-based tracking information for vehicle 1, the vehicle-based tracking information for vehicle 2, and/or the sensor-based tracking information for vehicle 2 as inputs for the collision predicting algorithm. In some implementations, sensor device 1, sensor device 2, vehicle 1, and/or vehicle 2 may provide data indicative of the size of vehicle 1 and/or vehicle 2, which the edge computing device may use to determine boundary parameters for vehicle 1 and/or vehicle 2. In some implementations, the edge computing device may use default boundary parameters for vehicle 1 and/or vehicle 2 (e.g., in the absence of data indicative of the size of vehicle 1 and/or vehicle 2). In this way, the edge computing device may predict whether vehicle 1 and vehicle 2 are likely to collide.

In some implementations, the edge computing device may calculate a predicted intersection of paths (x+, y+) for vehicle 1 and vehicle 2 using the following equations:

$$x_+ = \frac{(y_2 - y_1) - (x_2\tan\theta_2 - x_1\tan\theta_1)}{\tan\theta_1 - \tan\theta_2},$$

and $$y_+ = \frac{(x_2 - x_1) - (y_2\cot\theta_2 - y_1\cot\theta_1)}{\cot\theta_1 - \cot\theta_2},$$

where $(x_1, y_1)$ is the location of vehicle 1 (e.g., the location of vehicle 1 from the vehicle-based tracking information and/or the location of vehicle 1 from the sensor-based tracking information for vehicle 1), $(x_2, y_2)$ is the location of vehicle 2 (e.g., the location of vehicle 2 from the vehicle-based tracking information and/or the location of vehicle 2 from the sensor-based tracking information for vehicle 2), $\theta_1$ is the direction of travel of vehicle 1 (e.g., the direction of travel of vehicle 1 from the vehicle-based tracking information and/or the direction of travel of vehicle 1 from the sensor-based tracking information for vehicle 1), and $\theta_2$ is the direction of travel of vehicle 2 (e.g., the direction of travel of vehicle 2 from the vehicle-based tracking information and/or the direction of travel of vehicle 2 from the sensor-based tracking information for vehicle 2).

In some implementations, the edge computing device may calculate expected times to the predicted intersection of paths for vehicle 1 ($TTX_1$) and vehicle 2 ($TTX_2$) using the following equations:

$$TTX_1 = \frac{|\vec{r}_+ - \vec{r}_1|}{|\vec{v}_1|}\text{sign}((\vec{r}_+ - \vec{r}_1)\cdot\vec{v}_1),$$

and $$TTX_2 = \frac{|\vec{r}_+ - \vec{r}_2|}{|\vec{v}_2|}\text{sign}((\vec{r}_+ - \vec{r}_2)\cdot\vec{v}_2),$$

where $\vec{v}_1$ is the velocity of vehicle 1 (e.g., based on the location and direction of travel of vehicle 1 from the vehicle-based tracking information and/or the location and direction of travel of vehicle 1 from the sensor-based tracking information for vehicle 1), $\vec{v}_2$ is the velocity of vehicle 2 (e.g., based on the location and direction of travel of vehicle 2 from the vehicle-based tracking information and/or the location and direction of travel of vehicle 2 from the sensor-based tracking information for vehicle 2), $\vec{r}_n$ is a vector representation of coordinate $(x_n, y_n)$, and sign( ) is a sign function used to identify if a vehicle passed through the intersection. The edge computing device may calculate $TTX_1$ and $TTX_2$ to determine if vehicle 1 and vehicle 2 will pass through the intersection at the same time (e.g., $TTX_1=TTX_2$).

In some implementations, the edge computing device may determine whether the difference between $TTX_1$ and $TTX_2$ is less than a contention parameter α using the following equation:

$$|TTX_1 - TTX_2| < \alpha,$$

where the contention parameter α accounts for the fact that vehicle 1 and vehicle 2 are not abstract points. In some implementations, the edge computing device may determine the contention parameter α based on the boundary parameters for vehicle 1 and/or vehicle 2, an uncertainty of the tracking information for vehicle 1 and/or vehicle 2, the composite score of the tracking information for vehicle 1 and/or vehicle 2, a tolerance for risking collision, and/or the like. In some implementations, the edge computing device may determine a higher contention parameter α based on larger boundary parameters, greater uncertainty of the tracking information for vehicle 1 and/or vehicle 2, a higher composite score of the tracking information for vehicle 1 and/or vehicle 2, a lower tolerance for risking collision, and/or the like.

In some implementations, the edge computing device may selectively generate one or more instructions for controlling an action of vehicle 1 and/or vehicle 2 based on whether the vehicle-based tracking information for vehicle 1 matches the sensor-based tracking information for vehicle 1, whether the vehicle-based tracking information for vehicle 2 matches the sensor-based tracking information for vehicle 2, and/or whether vehicle 1 and vehicle 2 are predicted to collide. For example, if the vehicle-based tracking information for vehicle 1 matches the sensor-based tracking information for vehicle 1, the vehicle-based tracking information for vehicle 2 matches the sensor-based tracking information for vehicle 2, and vehicle 1 and vehicle 2 are not predicted to collide, the edge computing device may generate instructions permitting vehicle 1 and vehicle 2 to continue through the intersection without stopping.

As another example, if the vehicle-based tracking information for vehicle 1 does not match the sensor-based tracking information for vehicle 1 and the vehicle-based tracking information for vehicle 2 matches the sensor-based tracking information for vehicle 2, the edge computing device may generate instructions that include signaling one of vehicle 1 or vehicle 2 to stop and signaling the other of vehicle 1 and vehicle 2 to continue through the intersection without stopping. In this way, the edge computing device may, based on unconfirmed tracking information for vehicle 1 demonstrated by the lack of a match, generate instructions to stop either a vehicle having unconfirmed tracking information or a vehicle having confirmed tracking information. In some implementations, the edge computing device may generate instructions to stop a vehicle having confirmed tracking information (vehicle 2 in this example) and permit a vehicle having unconfirmed tracking information (vehicle 1 in this example) to continue through the intersection. In this way, the edge computing device may generate instructions to control vehicle 1 and/or vehicle 2 and prevent a potential collision caused by unconfirmed tracking information, which may indicate a problem with the sensor-based tracking information and/or the vehicle-based tracking information.

As yet another example, if vehicle 1 and vehicle 2 are predicted to collide, the edge computing device may generate instructions signaling one of vehicle 1 or vehicle 2 to stop and signaling the other of vehicle 1 or vehicle 2 to continue through the intersection without stopping. In some implementations, the edge computing device may generate instructions signaling one of vehicle 1 or vehicle 2 to stop and signaling the other of vehicle 1 or vehicle 2 to continue through the intersection without stopping if vehicle 1 and vehicle 2 are predicted to collide, even if the sensor-based tracking information for either of the vehicles does not match the vehicle-based tracking information. In this way, the edge computing device may generate instructions to stop one of the vehicles if a collision is predicted, regardless of whether vehicle 1 and/or vehicle 2 has unconfirmed tracking information.

As yet another example, if the vehicle-based tracking information for vehicle 1 matches the sensor-based tracking information for vehicle 1, the vehicle-based tracking information for vehicle 2 matches the sensor-based tracking information for vehicle 2, and vehicle 1 and vehicle 2 are predicted to collide, the edge computing device may generate instructions for controlling an action of vehicle 1 and/or vehicle 2 based on rules, where the rules optimize traffic flow, grant emergency vehicles right-of-way, stop vehicles farthest from an intersection, change based on weather conditions, and/or the like. For example, the edge computing device may generate instructions for stopping vehicle 1, rather than vehicle 2, based on rules indicating that a lane in which vehicle 2 is traveling experiences a heavy flow of traffic (e.g., on a given day of the week, during a period of time during the day, and/or the like).

As yet another example, if the vehicle-based tracking information for vehicle 1 matches the sensor-based tracking information for vehicle 1, the vehicle-based tracking information for vehicle 2 matches the sensor-based tracking information for vehicle 2, and vehicle 1 and vehicle 2 are predicted to collide, the edge computing device may generate instructions for controlling an action of vehicle 1 and/or vehicle 2 based on data from sensor device 1, sensor device 2, and/or traffic sensors (e.g., sensors in the roadway and/or the like) indicative of current traffic flow. For example, the edge computing device may receive data from sensor device 1, sensor device 2, and/or traffic sensors regarding a number of vehicles passing through one or more lanes of the intersection in a time period (e.g., vehicles/minute, vehicles/hour, and/or the like), and selectively generate instructions for stopping vehicle 1, rather than vehicle 2, based on data indicating that a lane in which vehicle 2 is traveling is currently experiencing a heavier traffic flow than a lane in which vehicle 1 in traveling.

In some implementations, the edge computing device may receive vehicle-based tracking information and/or sensor-based tracking information on a regular basis (e.g., every second, every two seconds, every five seconds, and/or the like) and/or on a continuous basis (e.g., in real-time, and/or the like) until vehicle 1 and/or vehicle 2 has exited the intersection. Additionally, or alternatively, the edge computing device may determine whether the vehicle-based tracking information matches the sensor-based tracking information on a regular basis (e.g., every second, every two seconds, every five seconds, and/or the like) and/or on a continuous basis (e.g., in real-time, and/or the like) until vehicle 1 and/or vehicle 2 has exited the intersection. In some implementations, the edge computing device may determine whether vehicle 1 and vehicle 2 are predicted to collide on a regular basis (e.g., every second, every two seconds, every five seconds, and/or the like) and/or on a continuous basis (e.g., in real-time, and/or the like) until vehicle 1 and/or vehicle 2 has exited the intersection. In this way, the edge computing device may monitor the intersection as conditions change (e.g., vehicle 1 and/or vehicle 2 turns, accelerates, slows down, stops, changes lanes, and/or the like) to determine whether a collision is predicted to occur.

As shown in FIG. 1D, and by reference number 140, the edge computing device may provide, to traffic control signal 1, an instruction to provide a signal to vehicle 1. For example, the edge computing device may provide, to traffic control signal 1, an instruction to provide a signal to proceed, to stop, to slow down, to use caution, and/or the like to vehicle 1 based on the selectively generated one or more instructions for controlling an action of vehicle 1. In some implementations, traffic control signal 1 may provide the signal to vehicle 1 using solid and/or flashing lights, arrows, symbols, and/or the like having different colors (e.g., red, yellow, and green).

In some implementations, the edge computing device may provide an instruction to vehicle 1 rather than, or in addition to, traffic control signal 1. For example, the edge computing device may provide, to vehicle 1, an instruction to proceed, stop, slow down, speed up, and/or the like to vehicle 1 based on the selectively generated one or more instructions for controlling an action of vehicle 1. In some implementations, vehicle 1 may perform an action based on the instruction, such as an action to automatically proceed, stop, slow down, speed up, and/or the like.

As shown in FIG. 1D, and by reference number 145, the edge computing device may provide, to traffic control signal 2, an instruction to provide a signal to vehicle 2. For example, the edge computing device may provide, to traffic control signal 2, an instruction to provide a signal to proceed, to stop, to slow down, to use caution, and/or the like to vehicle 2 based on the selectively generated one or more instructions for controlling an action of vehicle 2. In some implementations, traffic control signal 2 may provide the signal to vehicle 2 using solid and/or flashing lights, arrows, symbols, and/or the like having different colors (e.g., red, yellow, and green).

In some implementations, the edge computing device may provide an instruction to vehicle 2 rather than, or in addition to, traffic control signal 2. For example, the edge computing device may provide, to vehicle 2, an instruction to proceed, stop, slow down, speed up, and/or the like to vehicle 2 based on the selectively generated one or more instructions for controlling an action of vehicle 2. In some implementations, vehicle 2 may perform an action based on the instruction, such as an action to automatically proceed, stop, slow down, speed up, and/or the like.

Figure 1E:
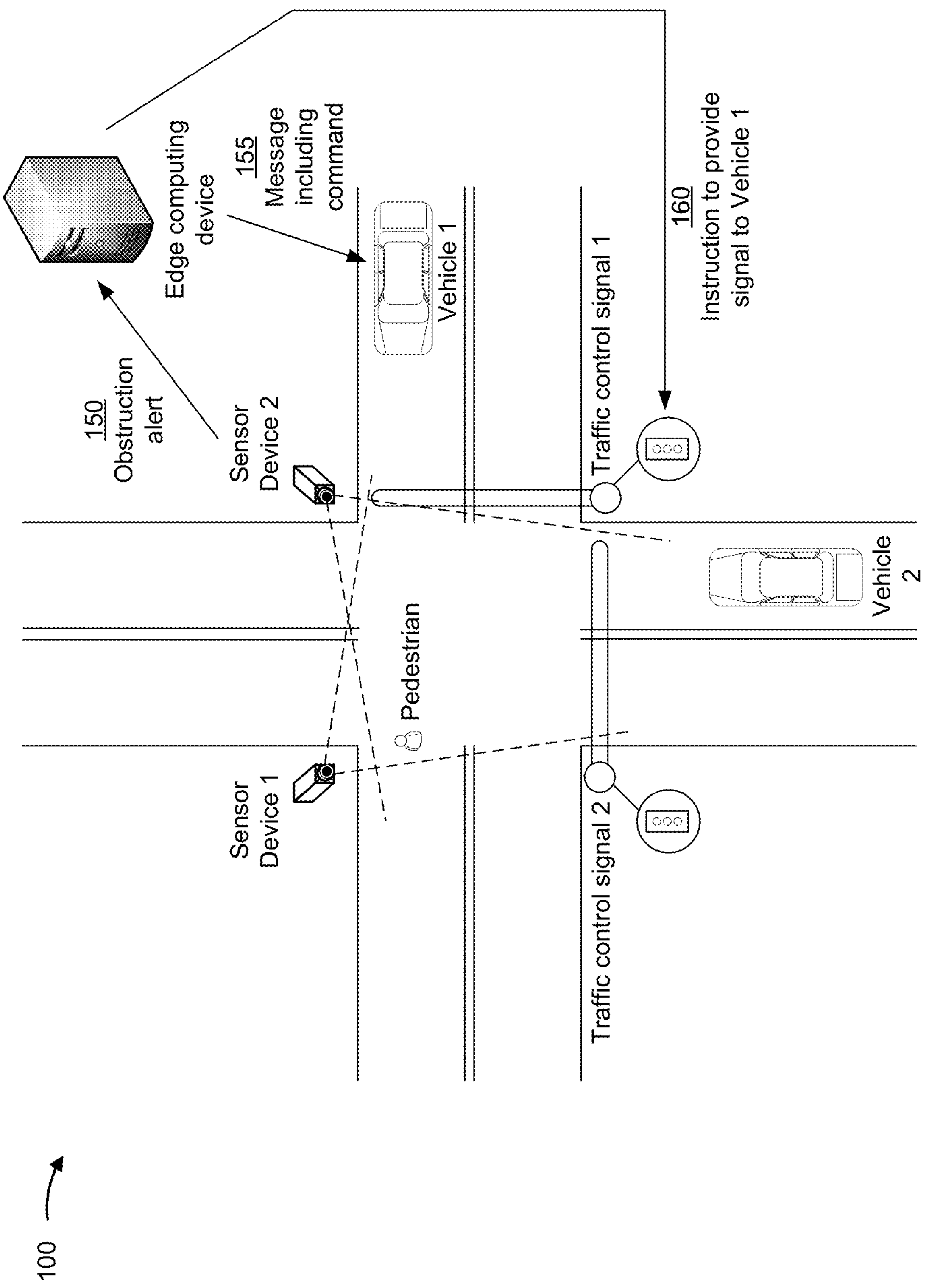

As shown in FIG. 1E, and by reference number 150, sensor device 2 may provide an obstruction alert to the edge computing device. For example, sensor device 2 may detect a pedestrian crossing the intersection and provide the obstruction alert to the edge computing device. In some implementations, sensor device 1 and/or sensor device 2 may detect an obstruction (e.g., a pedestrian, a cyclist, an object, and/or the like) in the intersection and, based on detecting the obstruction, provide an obstruction alert to the edge computing device. In some implementations, the obstruction alert may include a location of the obstruction, a type of the obstruction, a size of the obstruction, a speed of the obstruction, a direction of travel of the obstruction, a color of the obstruction, and/or the like.

In some implementations, sensor device 1 and/or sensor device 2 may detect obstructions and/or vehicles using a computer vision technique, such as a convolutional neural network technique to assist in classifying image data (e.g., image data including representations of vehicles, pedestrians, cyclists, obstructions, and/or the like) into a particular class. More specifically, the sensor device 1 and/or sensor device 2 may determine that a pedestrian has a particular characteristic (e.g., a height greater than a width, multiple appendages that move independently and in a particular pattern, and/or the like). On the other hand, sensor device 1 and/or sensor device 2 may determine that pedestrians do not have a particular characteristic and/or that cyclists do not have a particular characteristic. In some implementations, the computer vision technique may include using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, a cascade classification technique (e.g., a Haar cascade technique, a boosted cascade, a local binary pattern technique, and/or the like), and/or the like), an edge detection technique, an object in motion technique (e.g., an optical flow framework and/or the like), and/or the like. In this way, sensor device 1 and/or sensor device 2 may detect an obstruction in the intersection and, based on detecting the obstruction, provide an obstruction alert to the edge computing device that may include information regarding the obstruction.

As shown in FIG. 1E, and by reference number 155, the edge computing device may provide a message including a command to vehicle 1. In some implementations, the edge computing device may provide a message to vehicle 1 and/or vehicle 2 based on receiving an obstruction alert from sensor device 1 and/or sensor device 2. For example, the edge computing device may, based on receiving the obstruction alert from sensor device 2, provide a message to vehicle 1 including a command to maintain a current speed, slow down, accelerate, proceed through an intersection, stop before entering an intersection, stop immediately, and/or stop for a pedestrian. In some implementations, the command may control the operation of an autonomous vehicle (e.g., vehicle 1 and/or vehicle 2). In some implementations, the message may include information regarding the obstruction (e.g., a location of the obstruction, a type of the obstruction, a size of the obstruction, a speed of the obstruction, a direction of travel of the obstruction, a color of the obstruction, and/or the like).

Additionally, or alternatively, the edge computing device may provide a message to vehicle 1 and/or vehicle 2 based on determining whether vehicle 1 and vehicle 2 are predicted to collide. For example, the edge computing device may provide a message to vehicle 1 and/or vehicle 2 including a command (e.g., stop, slow down, maintain a speed, and/or the like), information regarding another vehicle approaching the intersection (e.g., text describing another vehicle approaching the intersection (e.g., "vehicle approaching intersection from the left"), a color of another vehicle approaching the intersection, a speed of another vehicle approaching the intersection, and/or the like), information regarding the intersection, and/or the like.

In some implementations, a vehicle device associated with vehicle 1 and/or vehicle 2 may display the message to a driver by displaying a user interface including the message and/or information in the message. For example, the vehicle device may display a user interface including text describing an obstruction, an image of an obstruction, a speed to maintain, a stop sign, and/or the like.

In some implementations, a vehicle device associated with vehicle 1 and/or vehicle 2 may, based on the message from the edge computing device, provide an audible alert to the driver. For example, the vehicle device may provide a voice-based audible warning, such as “vehicle approaching intersection from the right,” “slow down, pedestrian in roadway,” and/or the like. Additionally, or alternatively, the vehicle device may provide an audible warning tone (e.g., a beep, a siren, an alarm, and/or the like).

As shown in FIG. 1E, and by reference number 160, the edge computing device may provide, to traffic control signal 1, an instruction to provide a signal to vehicle 1. In some implementations, the edge computing device may provide, to traffic control signal 2 and/or traffic control signal 2 and based on the obstruction alert, an instruction to provide a signal to vehicle 1 and/or vehicle 2. For example, the edge computing device may provide, to traffic control signal 1 and based on the obstruction alert, an instruction to provide a signal to proceed, to stop, to slow down, to use caution, and/or the like to vehicle 1.

In this way, the edge device may conserve network resources used to control the traffic at the intersection because that data may be transmitted within a localized network comprising the edge device, vehicles, and various sensors within a particular intersection or region. Additionally, or alternatively, the edge device may confirm the accuracy of the data used to make the collision-predicting calculations by determining whether sensor-provided information and vehicle-provided information matches. In some implementations, the traffic control system may allow vehicles to pass freely through the intersection when no collision is predicted, which conserves fuel otherwise consumed while the vehicle is stopped. Additionally, or alternatively, the traffic control system may send messages to drivers approaching the intersection and/or commands for operating vehicles approaching the intersection, which increases the safety of the intersection and prevents financial-resource consuming collisions.

As indicated above, FIGS. 1A-1E are provided as examples. Other examples can differ from what is described with regard to FIGS. 1A-1E. For example, although FIGS. 1A-1E describe an example involving two vehicles (e.g., vehicle 1 and vehicle 2), an intersection of two roads each having two lanes, two sensor devices (e.g., sensor device 1 and sensor device 2), and two traffic control signals (e.g., traffic control signal 1 and traffic control signal 2), the techniques described herein may be applied to other examples involving any number of vehicles (e.g., one, three, four, twenty, one hundred, and/or the like) at intersections of greater complexity (e.g., multiple lanes in each direction, designated turning lanes, and/or the like) having more sensor devices and/or more traffic control signals.

Additionally, or alternatively, although FIGS. 1A-1E provide an example involving an intersection of two roads that cross each other, other examples may involve other traffic routing scenarios, such as a roundabout, an intersection of more than two roads, an intersection at which a first road does not pass through a second road and vehicles on the first road must turn right or left onto the second road (e.g., a “T” intersection, a “Y” intersection, and/or the like), one or more lanes merging with one or more other lanes (e.g., an on-ramp, an off-ramp, and/or the like), and/or the like. In some implementations, the traffic control system may use techniques described herein to prevent collisions in these other traffic routing scenarios.

The number and arrangement of devices shown in FIGS. 1A-1E are provided as one or more examples. In practice, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) of example implementations 100 may perform one or more functions described as being performed by another set of devices of example implementations 100.

Figure 2:
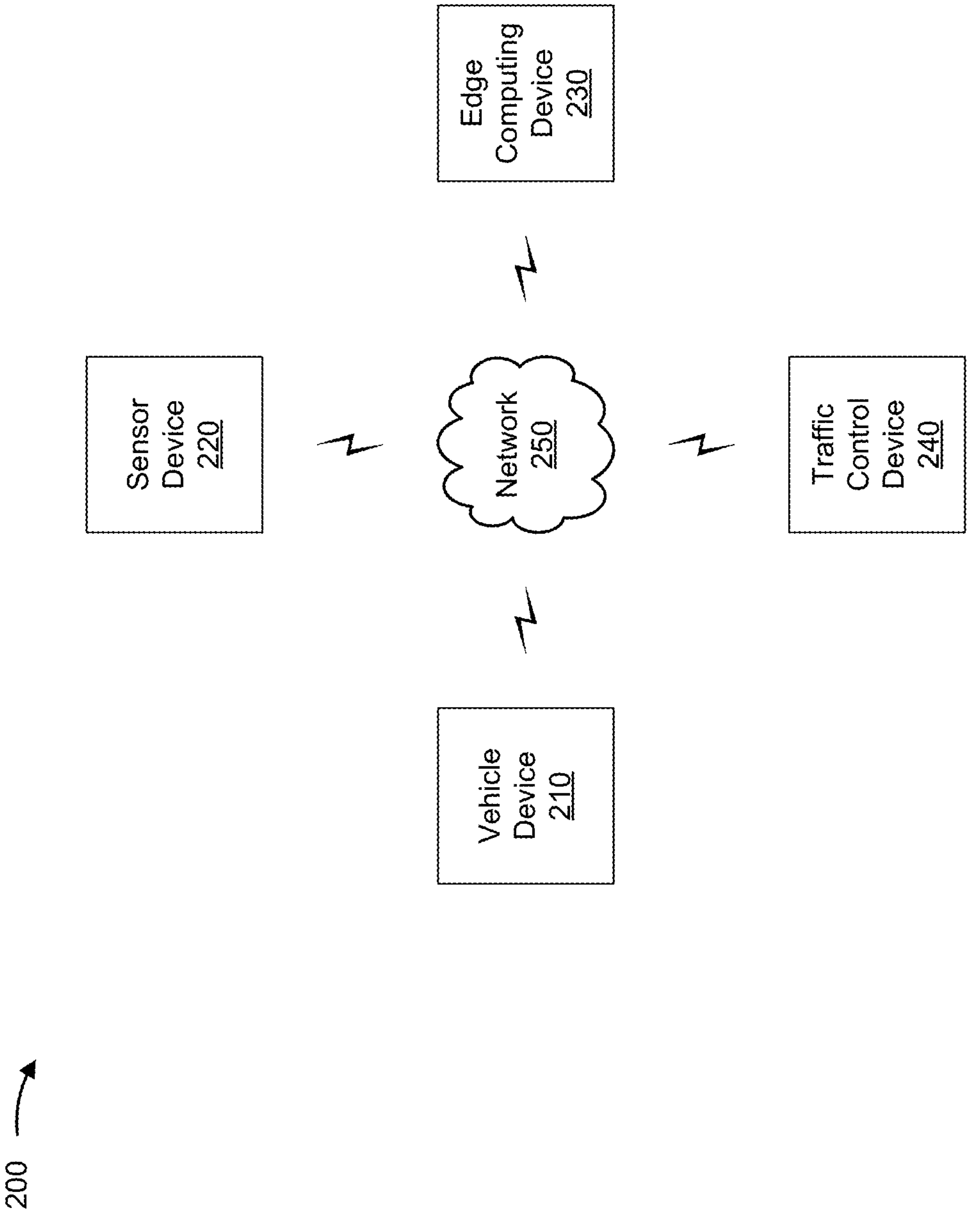
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a vehicle device 210, a sensor device 220, an edge computing device 230, a traffic control device 240, and a network 250. Devices of environment 200 may interconnect via wired connections, wireless connections, or a combination of wired and wireless connections.

Vehicle device 210 includes one or more devices capable of receiving, generating, storing, processing, and/or providing information associated with vehicle tracking, messages, commands for controlling a vehicle, and/or the like. For example, vehicle device 210 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), an in-vehicle system, a dongle device, and/or the like.

Sensor device 220 includes one or more devices capable of receiving, generating, storing, processing, and/or providing information associated with vehicle tracking, obstructions, pedestrians, road conditions, traffic conditions, and/or the like. For example, sensor device 220 may include a camera, a smart camera, a speed sensor, a motion sensor, an infrared sensor, and/or the like.

Edge computing device 230 includes one or more devices capable of receiving, generating, storing, processing, and/or providing information associated with vehicle tracking, collisions, obstructions, pedestrians, road conditions, traffic conditions, and/or the like. For example, edge computing device 230 may include a server, a gateway, a local data center, a base station, and/or the like.

Traffic control device 240 includes one or more devices capable of receiving, generating, storing, processing, and/or providing information associated with providing signals, instructions, and/or messages to vehicles. For example, traffic control device 240 may include a traffic light having one or more lights and/or displays for providing signals, instructions, and/or messages to vehicles, a crosswalk signal having one or more lights and/or displays for providing signals, instructions, and/or messages to pedestrians, a display board for providing signals, instructions, and/or messages to drivers, vehicles, and/or pedestrians, and/or the like.

Network 250 includes one or more wired and/or wireless networks. For example, network 250 may include a fiber optic-based network, an intranet, the Internet, a cloud computing network, a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
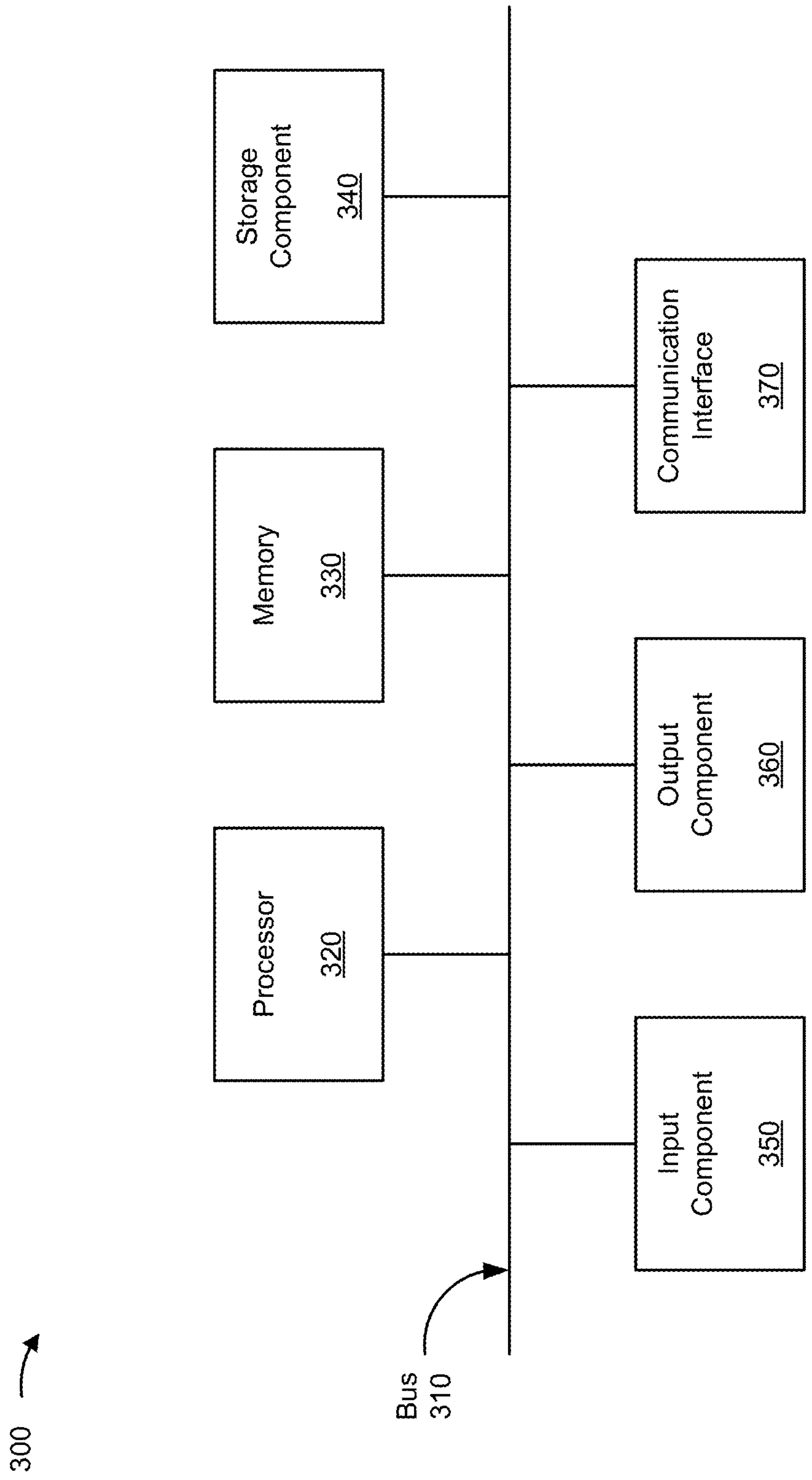
FIG. 3 is a diagram of example components of one or more devices of FIG. 2.

FIG. 3 is a diagram of example components of a device 300. Device 300 may correspond to vehicle device 210, sensor device 220, edge computing device 230, and/or traffic control device 240. In some implementations, vehicle device 210, sensor device 220, edge computing device 230, and/or traffic control device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
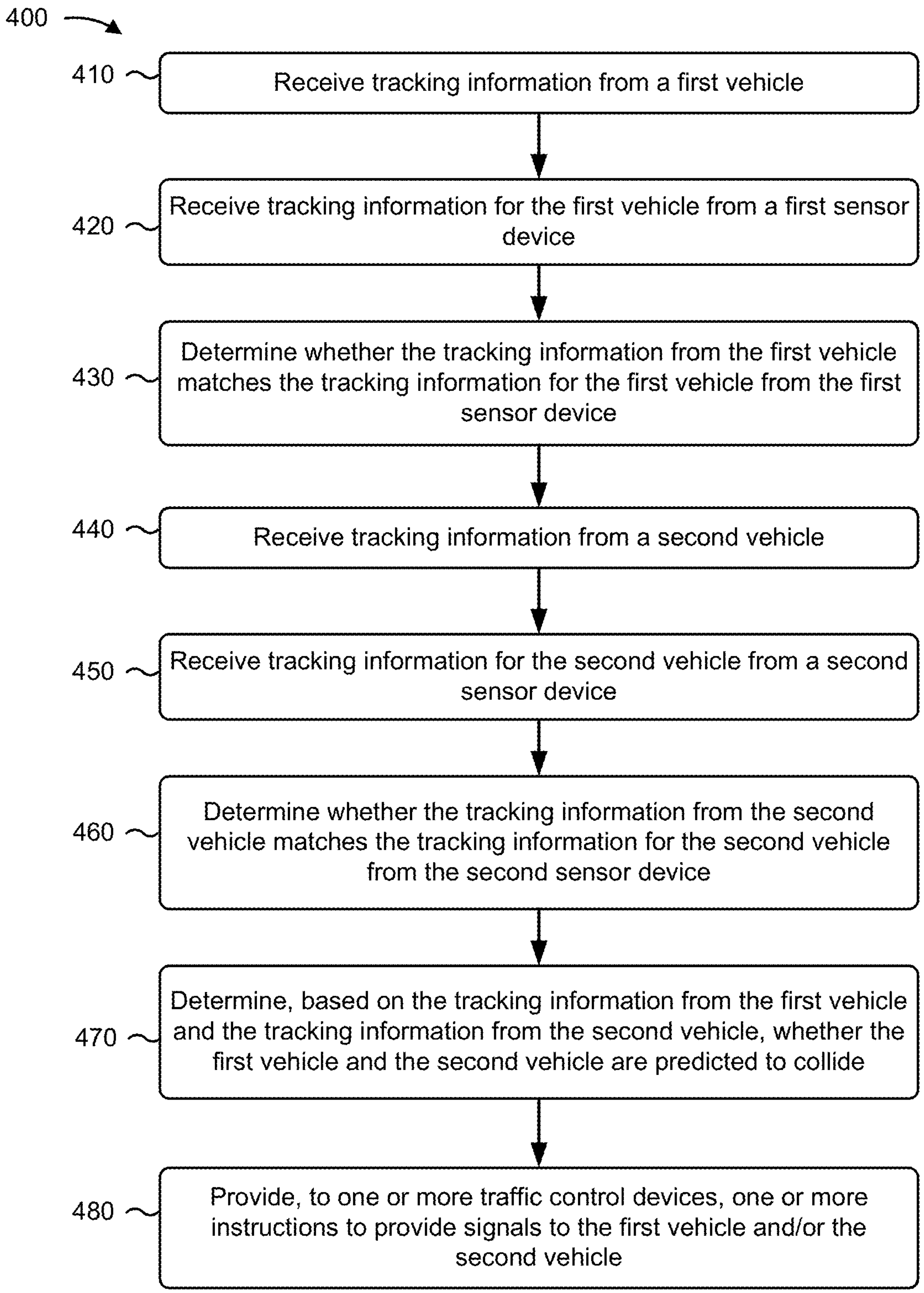
FIG. 4 is a flow chart of an example process for controlling vehicle traffic.

FIG. 4 is a flow chart of an example process 400 for controlling vehicle traffic. In some implementations, one or more process blocks of FIG. 4 may be performed by an edge device (e.g., edge computing device 230). In some implementations, one or more process blocks of FIG. 4 may be performed by another device or a group of devices separate from or including the edge device, such as a vehicle device (e.g., vehicle device 210), a sensor device (e.g., sensor device 220), a traffic control device (e.g., traffic control device 240), and/or the like.

As shown in FIG. 4, process 400 may include receiving tracking information from a first vehicle (block 410). For example, the edge device (e.g., using processor 320, memory 330, storage component 340, input component 350, output component 360, communication interface 370, and/or the like) may receive tracking information from the first vehicle, as described above. In some implementations, process 400 may include receiving, at an intersection and from a first device in the first vehicle moving towards the intersection, first-vehicle-provided-tracking information.

As further shown in FIG. 4, process 400 may include receiving tracking information for the first vehicle from a first sensor device (block 420). For example, the edge device (e.g., using processor 320, memory 330, storage component 340, input component 350, output component 360, communication interface 370, and/or the like) may receive tracking information for the first vehicle from a first sensor device, as described above. In some implementations, process 400 may include receiving, from a first sensor device at an intersection, sensor-provided-first-vehicle-tracking information.

As further shown in FIG. 4, process 400 may include determining whether the tracking information from the first vehicle matches the tracking information for the first vehicle from the first sensor device (block 430). For example, the edge device (e.g., using processor 320, memory 330, storage component 340, input component 350, output component 360, communication interface 370, and/or the like) may determine whether the tracking information from the first vehicle matches the tracking information for the first vehicle from the first sensor device, as described above. In some implementations, process 400 may include determining whether the first-vehicle-provided-tracking information matches the sensor-provided-first-vehicle-tracking information.

As further shown in FIG. 4, process 400 may include receiving tracking information from a second vehicle (block 440). For example, the edge device (e.g., using processor 320, memory 330, storage component 340, input component 350, output component 360, communication interface 370, and/or the like) may receive tracking information from a second vehicle, as described above. In some implementations, process 400 may include receiving, from a second device in a second vehicle moving towards the intersection, second-vehicle-provided-tracking information.

As further shown in FIG. 4, process 400 may include receiving tracking information for the second vehicle from a second sensor device (block 450). For example, the edge device (e.g., using processor 320, memory 330, storage component 340, input component 350, output component 360, communication interface 370, and/or the like) may receive tracking information for the second vehicle from a second sensor device, as described above. In some implementations, process 400 may include receiving, from a second sensor device at the intersection, sensor-provided-second-vehicle-tracking information.

As further shown in FIG. 4, process 400 may include determining whether the tracking information from the second vehicle matches the tracking information for the second vehicle from the second sensor device (block 460). For example, the edge device (e.g., using processor 320, memory 330, storage component 340, input component 350, output component 360, communication interface 370, and/or the like) may determine whether the tracking information from the second vehicle matches the tracking information for the second vehicle from the second sensor device, as described above. In some implementations, process 400 may include determining whether the second-vehicle-provided-tracking information matches the sensor-provided-second-vehicle-tracking information.

As further shown in FIG. 4, process 400 may include determining, based on the tracking information from the first vehicle and the tracking information from the second vehicle, whether the first vehicle and the second vehicle are predicted to collide (block 470). For example, the edge device (e.g., using processor 320, memory 330, storage component 340, input component 350, output component 360, communication interface 370, and/or the like) may determine, based on the tracking information from the first vehicle and the tracking information from the second vehicle, whether the first vehicle and the second vehicle are predicted to collide, as described above. In some implementations, process 400 may include determining, based on the first-vehicle-provided-tracking information and the second-vehicle-provided-tracking information, whether the first vehicle and the second vehicle are predicted to collide.

As further shown in FIG. 4, process 400 may include providing, to one or more traffic control devices, one or more instructions to provide signals to the first vehicle and/or the second vehicle (block 480). For example, the edge device (e.g., using processor 320, memory 330, storage component 340, input component 350, output component 360, communication interface 370, and/or the like) may provide, to one or more traffic control devices, one or more instructions to provide signals to the first vehicle and/or the second vehicle, as described above.

In some implementations, the one or more instructions may be based on whether the first-vehicle-provided-tracking information matches the sensor-provided-first-vehicle-tracking information, whether the second-vehicle-provided-tracking information matches the sensor-provided-second-vehicle-tracking information, and whether the first vehicle and the second vehicle are predicted to collide. For example, providing the one or more instructions to provide signals to the first vehicle and/or the second vehicle may include providing a first instruction to provide a stop signal to the first vehicle based on determining that the first-vehicle-provided-tracking information does not match the sensor-provided-first-vehicle-tracking information and/or providing a second instruction to provide a stop signal to the second vehicle based on determining that the second-vehicle-provided-tracking information does not match the sensor-provided-second-vehicle-tracking information. In another example, providing the one or more instructions to provide signals to the first vehicle and/or the second vehicle may include providing an instruction to provide a stop signal to the first vehicle or the second vehicle based on determining that the first vehicle and the second vehicle are predicted to collide.

In yet another example, providing the one or more instructions to provide signals to the first vehicle and/or the second vehicle may include providing an instruction to provide a stop signal to the first vehicle based on determining that the first vehicle and the second vehicle are predicted to collide and determining that the first-vehicle-provided-tracking information does not match the sensor-provided-first-vehicle-tracking information. In yet another example, providing the one or more instructions to provide signals to the first vehicle and/or the second vehicle may include providing instructions to provide signals to the first vehicle and/or the second vehicle based on rules, where the rules optimize traffic flow, grant emergency vehicles right-of-way, stop vehicles farthest from an intersection, and/or change based on weather conditions.

Process 400 may include additional implementations, such as any single implementation or any combination of implementations and/or examples described below and/or in connection with one or more other processes described elsewhere herein.

In another example, process 400 may include providing, to the first device and/or the second device, a message including one or more commands for a driver, where the one or more commands include maintain a current speed, slow down, accelerate, proceed through an intersection, stop before entering an intersection, stop immediately, and/or stop for a pedestrian. In some implementations, the message may include one or more commands for operating the first vehicle and/or the second vehicle.

In yet another example, process 400 may include receiving, from the first sensor device, the second sensor device, and/or a sixth device, an obstruction alert and providing, to the one or more traffic control devices, instructions to provide signals to the first vehicle and/or the second vehicle based on the obstruction alert.

In yet another example, process 400 may include, continuously and/or regularly and until the first vehicle and/or the second vehicle has exited the intersection, receiving vehicle-provided-tracking information and sensor-provided-tracking information for the first vehicle and/or the second vehicle, determining whether the vehicle-provided-tracking information matches the sensor-provided-tracking information for the first vehicle and/or the second vehicle, and determining whether the first vehicle and the second vehicle are predicted to collide.

In yet another example, process 400 may include selectively generating at least one instruction for controlling an action of the first vehicle and/or the second vehicle. In some implementations, the at least one instruction may be selectively generated based on determining whether the first-vehicle-provided-tracking information matches the sensor-provided-first-vehicle-tracking information, determining whether the second-vehicle-provided-tracking information matches the sensor-provided-second-vehicle-tracking information, and determining whether the first vehicle and the second vehicle are predicted to collide. Process 400 may further include selectively providing, to one or more traffic control devices, the at least one instruction to provide a signal to the first vehicle and/or the second vehicle.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

receiving, by an edge device, first vehicle information and first sensor information associated with a first vehicle;

receiving, by the edge device, second vehicle information and second sensor information associated with a second vehicle;

comparing, by the edge device, the first vehicle information and the first sensor information to determine a first accuracy score, wherein the first accuracy score is based at least in part on whether first vehicle information and the first sensor information are within a first threshold level of similarity;

comparing, by the edge device, the second vehicle information and the second sensor information to determine a second accuracy score, wherein the second accuracy score is based at least in part on whether the second vehicle information and the second sensor information are within a second threshold level of similarity;

determining, by the edge device and based on the first accuracy score and the second accuracy score, whether the first vehicle and the second vehicle are predicted to collide; and controlling, by the edge device, one or more traffic control devices, based on determining whether the first vehicle and the second vehicle are predicted to collide, wherein controlling the one or more traffic control devices comprises providing one or more control instructions, to the one or more traffic control devices, for the one or more traffic control devices to provide control signals to at least one of the first vehicle or the second vehicle.

2. The method of claim 1, wherein the first vehicle information and the first sensor information relate to a first location of the first vehicle; and wherein the at least one of the second vehicle information or the second sensor information relates to a second location of the second vehicle.

3. The method of claim 1, wherein the first vehicle information and the first sensor information relate to a first direction of travel of the first vehicle; and wherein the at least one of the second vehicle information or the second sensor information relates to a second direction of travel of the second vehicle.

4. The method of claim 1, wherein the first vehicle information and the first sensor information relate to a first speed of the first vehicle; and wherein the at least one of the second vehicle information or the second sensor information relates to a second speed of the second vehicle.

5. The method of claim 1, wherein receiving the first vehicle information and the first sensor information comprises:

receiving the first vehicle information from the first vehicle, and receiving the first sensor information from a first sensor device, wherein the first sensor device is located at a first location monitored by the edge device; and wherein receiving the at least one of the second vehicle information or the second sensor information comprises at least one of:

receiving the second vehicle information from the second vehicle, or receiving the second sensor information from a second sensor device, wherein the second sensor device is located at a second location monitored by the edge device.

6. The method of claim 1, wherein the at least one of the second vehicle information or the second sensor information comprises the second vehicle information and the second sensor information;

wherein the method further comprises:

comparing the second vehicle information and the second sensor information to determine a second accuracy score; and wherein determining whether the first vehicle and the second vehicle are predicted to collide is further based on the second accuracy score.

7. The method of claim 1, wherein the control signals relate to operation of the least one of the first vehicle or the second vehicle.

8. The method of claim 1, wherein the first vehicle information and the first sensor information are within the first threshold level of similarity; or wherein the first vehicle information and the first sensor information are not within the first threshold level of similarity.

9. The method of claim 1, wherein the second vehicle information and the second sensor information are within the second threshold level of similarity; or wherein the second vehicle information and the second sensor information are not within the second threshold level of similarity.

10. An edge device, comprising:

one or more memories; and one or more processors, communicatively coupled to the one or more memories, configured to:

receive, from at least one of a first vehicle or a first sensor device, first information comprising first vehicle information and first sensor information associated with the first vehicle;

receive, from at least one of a second vehicle or a second sensor device, second information comprising second vehicle information and second sensor information associated with the second vehicle;

determine, a first accuracy score associated with the first information and a second accuracy score associated with the second information, wherein the first accuracy score is based at least in part on whether first vehicle information and the first sensor information are within a first threshold level of similarity and wherein the second accuracy score is based at least in part on whether the second vehicle information and the second sensor information are within a second threshold level of similarity;

determine, based on the first information, the second information, the first accuracy score, and the second accuracy score, whether the first vehicle and the second vehicle are predicted to collide; and control, by the edge device, one or more traffic control devices, based on determining whether the first vehicle and the second vehicle are predicted to collide, wherein the one or more processors, when controlling the one or more traffic control device, are configured to provide one or more control instructions, to the one or more traffic control devices, for the one or more traffic control devices to provide control signals to at least one of the first vehicle or the second vehicle.

11. The edge device of claim 10, wherein the first information relates to at least two of a first location of the first vehicle, a first direction of travel of the first vehicle, and a first speed of the first vehicle; and wherein the second information relates to at least two of a second location of the second vehicle, a second direction of travel of the second vehicle, and a second speed of the second vehicle.

12. The edge device of claim 10, wherein the first information relates to a first location of the first vehicle, a first direction of travel of the first vehicle, and a first speed of the first vehicle; and wherein the second information relates to a second location of the second vehicle, a second direction of travel of the first vehicle, and a second speed of the second vehicle.

13. The edge device of claim 10, wherein the one or more processors, when receiving the first information, are configured to:

receive the first vehicle information from the first vehicle, and receive the first sensor information from the first sensor device;

and wherein the one or more processors, when receiving the second information, are configured to:

receive the second vehicle information from the second vehicle, and receive the second sensor information from the second sensor device.

14. The edge device of claim 13, wherein the one or more processors, when determining the first accuracy score and the second accuracy score, are configured to:

compare the first vehicle information and the first sensor information to determine the first accuracy score, and compare the second vehicle information and the second sensor information to determine the second accuracy score.

15. The edge device of claim 10, wherein the one or more processors, when determining whether the first vehicle and the second vehicle are predicted to collide, are configured to:

determine that the first vehicle and the second vehicle are predicted to collide; and wherein the one or more processors, when providing the one or more control instructions for the one or more traffic control devices to provide the control signals to the at least one of the first vehicle or the second vehicle, are configured to:

provide a control instruction to provide a stop signal to the at least one of the first vehicle or the second vehicle.

16. A non-transitory computer-readable medium storing instructions, the instructions comprising:

one or more instructions that, when executed by one or more processors, cause the one or more processors to:

determine a first accuracy score, associated with first information associated with a first vehicle, and a second accuracy score associated with second information associated with a second vehicle, wherein the first accuracy score indicates whether a subset of the first information and another subset of the first information are within a first threshold level of similarity, and wherein the second accuracy score indicates whether a subset of the second information and another subset of the second information are within a second threshold level of similarity, wherein the first information relates to at least one of a first location of the first vehicle, a first direction of travel of the first vehicle, or a first speed of the first vehicle, and wherein the second information relates to at least one of a second location of the second vehicle, a second direction of travel of the second vehicle, or a second speed of the second vehicle;

determine, based on the first information, the second information, the first accuracy score, and the second accuracy score, whether the first vehicle and the second vehicle are predicted to collide; and control, one or more traffic control devices, based on determining whether the first vehicle and the second vehicle are predicted to collide, wherein the one or more instructions, that cause the one or more processors to control the one or more traffic control devices, are configured to provide one or more control instructions, to the one or more traffic control devices, for the one or more traffic control devices to provide control signals to at least one of the first vehicle or the second vehicle.

17. The non-transitory computer-readable medium of claim 16, wherein the one or more instructions, when executed by one or more processors, further cause the one or more processors to:

receive the subset of the first information and the other subset of the first information, and receive the subset of the second information and the other subset of the second information;

wherein the first accuracy score is based on the subset of the first information and the other subset of the first information satisfying the first threshold level of similarity; and wherein the second accuracy score is based on the subset of the second information and the other subset of the second information satisfying the second threshold level of similarity.

18. The non-transitory computer-readable medium of claim 16, wherein the one or more instructions, when executed by one or more processors, further cause the one or more processors to:

receive the subset of the first information and the other subset of the first information; and wherein the first accuracy score is based on the subset of the first information and the other subset of the first information not satisfying the first threshold level of similarity.

19. The non-transitory computer-readable medium of claim 17, wherein the one or more instructions, that cause the one or more processors to provide the control instructions for the one or more traffic control devices to provide control signals to the at least one of the first vehicle or the second vehicle, cause the one or more processors to:

provide a first control instruction, of the control instructions, to provide a stop signal to the first vehicle, and provide a second control instruction, of the control instructions, to permit the second vehicle to continue traveling.

20. The non-transitory computer-readable medium of claim 16, wherein the one or more instructions, that cause the one or more processors to provide the control instructions for the one or more traffic control devices to provide control signals to the at least one of the first vehicle or the second vehicle, cause the one or more processors to:

provide a control instruction, of the control instructions, to permit the at least one of the first vehicle or the second vehicle to continue through an intersection without stopping.

* * * * *